331 - 86

EXAMIN

April 29, 1952 W. C. BROWN Re. 23,480

CAVITY RESONATOR ELECTRON DISCHARGE DEVICE Orig. 2557,780

Original Filed April 19, 1947 2 SHEETS—SHEET 1

INVENTOR
WILLIAM C. BROWN
BY Elmer J. Gore
ATTY.

EXAMIN

CAVITY RESONATOR ELECTRON DISCHARGE DEVICE

Original Filed April 19, 1947 2 SHEETS—SHEET 2

INVENTOR
WILLIAM C. BROWN
BY
Elmer J. Gon
ATTORNEY

EXAMIN

Reissued Apr. 29, 1952

Re. 23,480

UNITED STATES PATENT OFFICE 23,480

CAVITY RESONATOR ELECTRON DISCHARGE DEVICE

William C. Brown, Weston, Mass., assignor to Raytheon Manufacturing Company, Newton, Mass., a corporation of Delaware Original No. 2,557,780, dated June 19, 1951, Serial No. 742,541, April 19, 1947. Application for reissue November 20, 1951, Serial No. 257,397

7 Claims. (Cl. 315—39)

Matter enclosed in heavy brackets [ ] appears in the original patent but forms no part of this reissue specification; matter printed in italics indicates the additions made by reissue.

This invention relates to electron discharge devices having a plurality of cavity resonators, and more particularly to those for generating oscillations of short wave length.

One of the objects of the present invention is to provide a device of the type referred to which shall have an improved symmetrical coupling for all of the cavity resonators, by which the ratio of energy actually delivered, to that generated by the device, is materially increased.

The above object and such other aims and objects of the present invention as may hereinafter appear will be best understood from the following description, taken in connection with the accompanying drawings of several embodiments of the invention herein presented for illustrative purposes.

The invention is herein illustratively shown and described in its application to that type of electron discharge device known as a magnetron.

Figure 1:
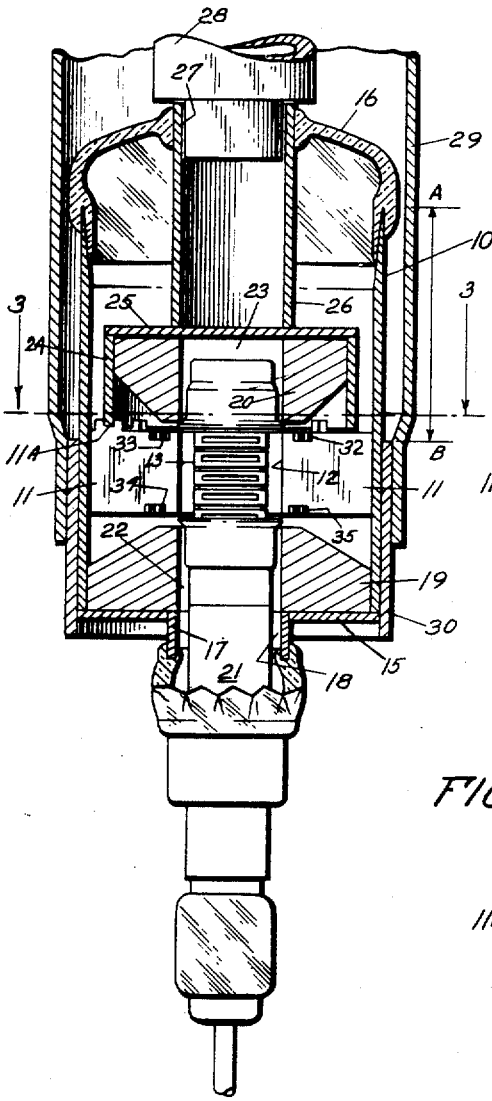
Fig. 1 is a central, longitudinal section of an electron discharge device, as viewed along line 1—1 of Fig. 3, incorporating one illustrative embodiment of the invention.

Referring now to Fig. 1, there is shown a cylindrical member 10 having soldered to its inner surface a plurality of suitably spaced, radially disposed anode arms 11, the inner edge surfaces of which constitute anode faces 12. Said cylindrical member and anode arms are preferably made of copper and said anode surfaces are disposed substantially parallel to an electron-emissive cathode 13. For example, said cathode may be a slotted tungsten cylinder suitably supported axially of said anode surfaces. Each pair of said anode arms 11, with the intervening portion of said cylindrical member 10, constitutes a cavity resonator 14, see Fig. 3.

The cylindrical member 10 is hermetically sealed at both ends, thus forming a hermetically sealed envelope or enclosure. In the illustrative embodiment of Fig. 1, a disc member 15 and vitreous member 16 are used to complete the aforementioned envelope. The member 15, preferably constructed of copper, is suitably apertured, as at 18, to receive, as by soldering, a tubular member 17, or the disc 15 and tubular member 17 may be constructed as a unitary member.

Concentrically disposed within said cylindrical member are a pair of pole pieces 19—20. Said pole pieces are partially cylindrical and partially the frustum of a cone. The smaller of the two parallel areas of said frustum serves to concentrate any magnetic field present between said pole pieces. The pole piece 19 is disposed within that portion of the envelope providing ingress for a cathode lead-in and supporting member 21. Both of the pole pieces are provided, respectively, with bores 22—23, the bore 22 being in register with the aperture 18. The other pole piece 20 is disposed within an electrically conductive member in the form of a cylindrical cap 24. Said cap is preferably made of copper, the open end being disposed in slots 11A provided in alternate anode arms 11. Integral with the flat portion 25 of said cap is the open end of an electrically conductive tubular member 26, preferably made of copper. The opposite open end of said tubular member is hermetically sealed along its edge in an aperture 27 in the vitreous member 16, the particular arrangement just described being adapted to receive an inner conductor 28 of a coaxial transmission line comprising said inner conductor 28 and an outer conductor 29. Intermediate said outer conductor 29 and the envelope 10 is a tubular member 30. This tubular member is adjusted so that, between points A and B, the distance is equal to a half wavelength of the operating frequency of the electron discharge device. When so adjusted it serves in the capacity of a radio frequency choke in a manner well known to those skilled in the art to which it pertains.

If the above-described device be energized and a longitudinal field be excited within the device by suitable means, as for example by supplying said pole pieces 19—20 with a magnetic field from an external magnet, oscillations will be generated in the cavity resonators 14 which may be led out of the device to a suitable utilizing circuit by means of the novel coupling device just described, comprising the cap 24 and tubular member 26.

In operation, the polarity of the anode arms 11 is constantly shifting, alternate arms being always of the opposite polarity to that of the intervening arms. By its connection with the alternate arms, the coupling cap 24 transfers the energy of said alternate arms to the tubular member 26 and thence to the inner conductor 28, while that from the intervening anode arms is transferred through the envelope 10, the tubular member 30 to the outer conductor 29. Since said conductors 28 and 29 form the inner and outer conductors, respectively, of a coaxial line, the energy collected by said coupling cap 24 is caused to flow out due to the difference of potential of said two conductors.

Figure 2:
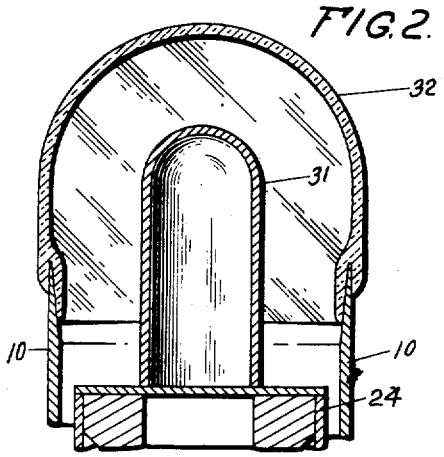
Fig. 2 is a partial, longitudinal section of an electron discharge device incorporating a second illustrative embodiment of the present invention.

Fig. 2 is an alternative embodiment adapted for connection to a wave guide system. In this particular embodiment, the cap 24 is surmounted by a dome-shaped cap 31 which may serve as an exciting probe for a wave guide in a manner familiar to those versed in the art. A vitreous member also formed in the shape of a dome 32 serves to hermetically seal the upper portion of the cylindrical member 10. The above-described embodiment of the present invention is adapted to be directly inserted in a wave guide section of a wave guide system and when properly energized, as hereinbefore described, will propagate such energy through said wave guide system.

Figure 3:
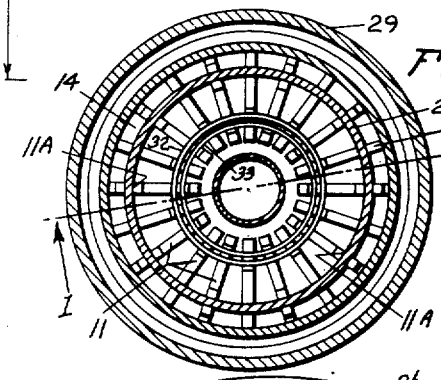
Fig. 3 is a horizontal cross-sectional on line 3—3 of Fig. 1.

Fig. 3 is a cross-sectional view taken along line 3—3 of Fig. 1 and clearly details the relative position of the cap 24 with respect to the anode arms 11. It also illustrates the manner in which said cap 24 is attached to the alternate anode arms 11 by means of the slots 11A. A pair of electrically conductive straps 32—33 are connected, respectively, to the alternate and intervening anode arms to arrest the generation of spurious oscillations.

Figure 4:
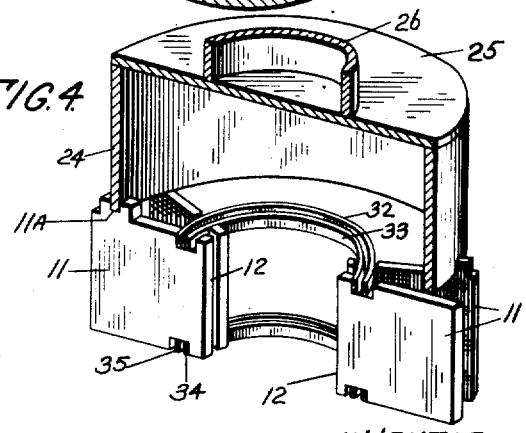
Fig. 4 is a perspective view showing the energy transferring means of the output coupling and how it cooperates with the resonant cavities.

Fig. 4 is a perspective view of the invention wherein, for the sake of clarity, only a portion of the anode arms 11 are shown, together with a fragmentary view of the cap 24 and the tubular member 26 surmounting same. Here is clearly indicated the manner in which the cap 24 is disposed in the slots 11A provided in the alternate anode arms 11. A second pair of electrically conductive straps 34—35, substantially identical with straps 32 and 33, are connected, respectively to alternate and intervening anode arms.

Figure 5:
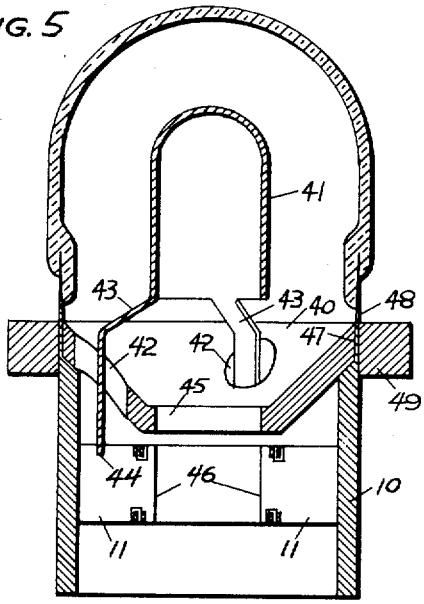
Fig. 5 is a partial longitudinal section of an electron discharge device incorporating a third illustrative embodiment of the present invention.

Fig. 5 represents a third embodiment of the present invention. Whereas, the first and second embodiments were adapted to magnetrons, for example which employ twenty anode arms or less, it is necessary in the case of magnetrons employing more than twenty anode arms that the coupling cap 24, Figs. 1 and 2, be smaller in its diametrical dimensions as the number of anode arms employed are increased beyond, for example, twenty arms. How the proper dimensions are arrived at will be discussed in connection with Figs. 6, 7, 8, 9, and 10.

In this third embodiment, the reduction of the diametrical proportions of the coupling cap makes its necessary to alter the type of pole piece used. It was found necessary to provide a pole piece 40 and a coupling cap 41 of the type illustrated. It will be appreciated that as the coupling cap dimensions were made smaller it was no longer possible to dispose the pole piece within said coupling cap because the gap between said pole piece and the external magnetizing means, not shown, would increase the reluctance path considerably. As a result of such increase in reluctance, the external magnetizing means would begin to assume proportions which would be bulky and uneconomical.

To overcome the aforesaid obstacles, the pole piece 40 was provided with a plurality of apertures 42 and the coupling cap 41 with an equal number of prongs 43 of suitable dimensions to enable them to pass freely, and without touching, through the apertures 42, the ends of said prongs being connected to the anode arms 11 within slots 44 provided therein. The pole piece 40 was made in the form of a thick shallow dish with an aperture 45 in the bottom thereof, said aperture being in register with the opening formed by the inner edges 46 of the anode arms 11. The aperture 45 permits one end of the cathode structure, see Fig. 1 to extend therethrough. The upper edge 47 of said pole piece is soldered within the cylindrical member 10, said member having a substantially thinner wall section 48 at this point of connection.

By providing a thin wall section at this point, the reluctance path, between the pole piece edge 47 and an external pole piece ring 49, is kept to a minimum, when suitable magnetizing means are attached to said pole piece ring 49.

For best results, the dimensions of the coupling cap should be such that the energy stored per cycle in the magnetron will have a certain ratio to the power dissipated in a matched load. This ratio will be designated hereinafter as the $Q_E$ of an axial output electron discharge device of the type hereinbefore described.

Figure 6:
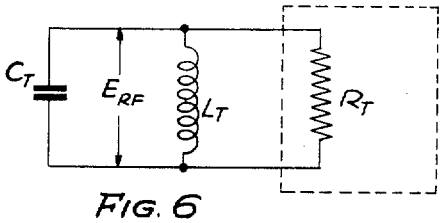
Figs. 6 and 7 are schematic diagrams of equivalent circuits of the electron discharge device.
Figure 7:
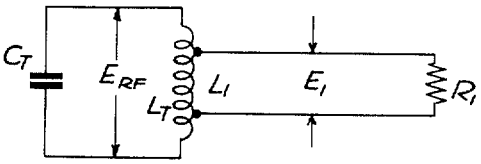

Figs. 6 and 7 illustrate schematically the equivalent circuit of the above-described electron-discharge device in which $C_T$ and $L_T$ represent, respectively, the total capacity and inductance associated with said device, while $E_{RF}$ represents the total radio frequency voltage across the aforementioned $C_TL_T$ combination. $R_T$ is the total resistance or external load which will give the desired $Q_E$ when connected in parallel with said $L_T$. $Q_E$ is determined by the following equation $$Q_E=\frac{\frac{E_{RF}^2}{\omega L_T}}{\frac{E_{RF}^2}{R_T}}=\frac{R_T}{\omega_{L_T}}$$

In the above equation $\omega$ is $2\pi$ times the frequency of the proper mode.

If, for example, a $Q_E$ of the order of 200 is desired, in a magnetron employing twenty anode arms or less, $R_T$ becomes greater than 500 ohms, and it is therefore, not convenient to connect the load across $E_{RF}$. However, it is practical to connect the load across a fraction of said $E_{RF}$ as illustrated in Fig. 7.

Now, in order to maintain the desired $Q_E$, the power delivered to the load must be the same as before, or $$\frac{E_{RF}^2}{R_T}=\frac{E_1^2}{R_1}$$

This may be written $$\frac{L_T^2}{R_T}=\frac{L_1^2}{R_1}$$

or $$\frac{R_T}{L_T}=\frac{L_TR_1}{L_1^2}$$

EXAMINE

Therefore $$Q_E = \frac{L_T R_1}{\omega L_1^2}$$

Knowing $Q_E$ it now remains to determine $R_1$ and $L_1$ as will be presently described.

Figure 8:
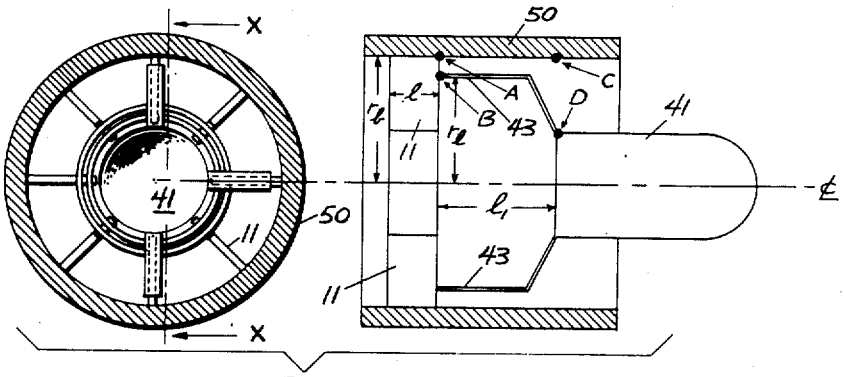
Fig. 8 is a sketch of the embodiment shown in Fig. 5 for the purpose of mathematical calculations utilized to determine the electrical connections of the electron discharge device.
Figure 9:
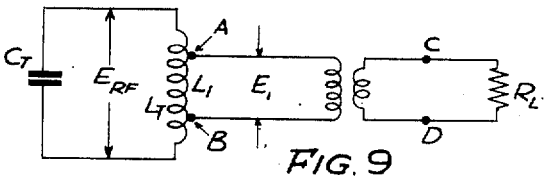
Fig. 9 is an equivalent circuit of the sketch shown in Fig. 8.

Fig. 8 is a sketch of an axial output device of the type herein described, the left-hand view, with respect to the drawing, being a transverse cross-section looking along the axis ℄ of the right-hand view from right to left, said right-hand view being a longitudinal cross-section taken along line X—X of the left-hand view, while Fig. 9 represents an equivalent circuit of the sketch in Fig. 8. With reference to Fig. 8, $r_b$, $r_1$ and l and $l_1$, said dimensions are in inches.

The impedance $R_L$, Fig. 9, at the terminals C—D will be the characteristic impedance of the coaxial line at points C—D in Fig. 8. The connection for C—D to A—B is made by a plurality of prongs 43 which pass through apertures in the pole piece shown in Fig. 5. The pole piece is not taken into account in any of the calculations above or any to be described presently. $R_L$ transformed through the section of line between C—D and A—B becomes the $R_1$ needed to determine $Q_E$.

The method used to determine the characteristic impedance, designated herein as $Z_0$, of the section C—D to A—B is as follows.

Figure 10:
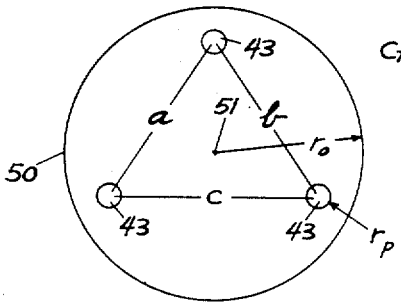
Fig. 10 is a view along the axis of the electron discharge device illustrated in Fig. 8 showing the relative disposition of the prongs of the energy-transferring means for purposes of mathematical calculations.

Assuming three prongs 43 were used to connect C—D to A—B, the transmission line will appear as illustrated in Fig. 10 when viewed along its axis. Therefore $$Z_0 = 60 \log \frac{D_m}{D_s} \text{ ohms}$$

where $D_m$ is the geometric mean distance between all points on the outer conductor 50 and all points on the inner conductor 51 which, in the case of one conductor completely enclosing the other, is the radius $r_0$ of the outer conductor, or $D_m$ equals $r_0$. $D_s$ is the geometric mean distance between all the points on the inner conductor, or the self-geometric mean distance. The so-called self-geometric mean distance of a circle is its radius. The expression for $D_s$ is $$D_s = \sqrt[n^2]{a^2 \times b^2 \times c^2 \times r_p^2}$$

$$a = b = c \qquad D_s = \sqrt[9]{a^6 r_p^3}$$

where a, b, and c are, respectively, the distances between the centers of the prongs 43, n being equal to the number of prongs and $r_p$ the size of the prongs, said size being as small as possible, commensurate with the amount of power the prongs are to carry, in order to minimize the size of the apertures in the pole piece.

In the case of the first embodiment, wherein the coupling cap 24 was entirely cylindrical, the calculations for determining $D_s$ would be based on the number of anode arms contacted by said cap, each contact being considered a prong. Therefore, for n number of prongs equally spaced on the circumference of a circle of radius R $$D_s = \sqrt[n^2]{\left(R^{n-1}\sqrt{n}\right)^{n(n-1)}(r_p^n)}$$

Using $R_L$ as a terminating impedance for a coaxial line of characteristic impedance $Z_0$ and length $l_1$, the value of $R_1$ is found by ordinary long line transmission theory. $L_1$ is calculated as follows:

$$2L_1 = \frac{30{,}480}{N}\left[\frac{(r_b - r_1)\left[\left(\frac{\pi}{N}(r_b + r_1) - t\right)\right]}{1 + \frac{r_b - r_1}{3}}\right]\mu\mu h.$$

where 30,480 is a numerical constant that provides a practical unit ($\mu\mu$h.), N is the number of anode arms, t is the thickness of said anode arms and the other symbols $r_b$, $r_1$ and l are dimensional values as indicated in Fig. 8. A value of $r_1$ can now be chosen and $L_1$ and $R_1$ determined, which will yield $Q_E$; $r_1$ may now be adjusted to produce the desired $Q_E$, remembering that as $r_1$ increases, $Q_E$ increases.

As a result of the simple and compact structure herein described, the invention provides novel means for transferring energy from each resonant cavity, or any desired number of resonant cavities, without the complicated structure and planning such an arrangement would entail if one were to utilize such means as hairpin type probes and the like.

The embodiments of the present invention which have been illustrated and described have been selected for the purpose of setting forth the principles involved. It will be obvious, however, that the invention may be modified to meet various conditions which may be met with in different specific uses and it is, therefore, intended to cover by the appended claims all such modifications which fall within the spirit and scope of this invention.

What is claimed is:

1. An electron discharge device comprising: a cathode; an anode structure spaced from said cathode and provided with a plurality of cavity resonators; a first conductor connected to said anode structure and constituting one of the conductors of a transmission line; a conductive cap connected to one of said cavity resonators in a region of relatively low radio-frequency voltage; and a second conductor electrically connected to said cap said second conductor constituting the other conductor of said transmission line.

2. An electron discharge device comprising: a cathode; an anode structure spaced from said cathode and provided with less than a critical number of cavity resonators; a first conductor connected to said anode structure and constituting one of the conductors of a transmission line; a conductive cap connected to one of said cavity resonators in a region of relatively low radio-frequency voltage; and a second conductor electrically connected to said cap said second conductor constituting the other conductor of said transmission line.

3. An electron discharge device comprising: an electrically conductive envelope; said envelope constituting the outer conductor of a transmission line; a cathode mounted within said envelope; a plurality of anode arms extending inwardly from said envelope and surrounding said cathode; each pair of adjoining anode arms, together with that portion of said envelope therebetween, constituting a cavity resonator; an electrically conductive cap, the open end of which is connected to that portion of the alternate anode arms adjacent said envelope; and an electrically conductive tubular member connected exteriorly to the closed end of said cap and constituting the inner conductor of said transmission line.

4. An electron discharge device comprising:

an electrically conductive envelope; said envelope constituting the outer conductor of a transmission line; a cathode mounted within said envelope; a plurality of anode arms extending inwardly from said envelope and surrounding said cathode; each pair of adjoining anode arms, together with that portion of said envelope therebetween, constituting a cavity resonator; an electrically conductive cap, the open end of which is connected to that portion of the alternate anode arms adjacent said envelope; an electrically conductive tubular member connected exteriorly to the closed end of said cap and constituting the inner conductor of said transmission line; and a pair of pole pieces, the field of which extends longitudinally of said envelope, one of said pole pieces being disposed within said electrically conductive cap and the other oppositely disposed, with respect to said first-named pole piece, within said envelope.

[5. An electron discharge device adapted to be connected to a load having a predetermined resistive impedance comprising: an electrically conductive envelope; a conductor connected to said envelope and constituting the outer conductor of a transmission line; a cathode mounted within said envelope; a plurality of anode arms extending inwardly from said envelope and surrounding said cathode; each pair of adjoining anode arms, together with that portion of said envelope therebetween, constituting a cavity resonator; and an electrically conductive member, the open end of which is connected to a point on one of said anode arms, the distance between said point of connection and the axis of said envelope having a predetermined value satisfying the equation $$200=\frac{L_T R_l}{\omega L_l^2}$$

where $R_l$=the value of the resistive component of the impedance looking into the transmission line when said load is connected to said device, $T_T$=total equivalent inductance of a cavity resonator, $\omega=2\pi$ times the frequency, $$L_l=\left(\frac{15{,}240}{N}\left[\frac{(r_b-r_l)\left[\frac{\pi}{N}(r_b+r_l)-t\right]}{1+\frac{r_b-r_l}{3}}\right]\right)^2$$

where in the equation for $L_l$

N=the number of anode arms, rb=the radius of the envelope with respect to its axis, rl=the distance between the electrically conductive member and the axis of said envelope.

l=the length of the anode arms parallel with the axis of said envelope, and t=the thickness of the anode arms, said electrically conductive member constituting the other conductor of said transmission line.]

6. An electron discharge device comprising: a cathode; an anode structure, spaced from said cathode, and incorporating a cavity resonator; a transmission line including a pair of conductors electrically connected to spaced points on said cavity resonator; and a pair of pole pieces disposed adjacent said anode structure at opposite ends of said cavity resonator; one of said pole pieces being supported by one of the conductors of said transmission line.

7. An electron discharge device comprising: a cathode; an anode structure, spaced from said cathode, and incorporating a cavity resonator; a transmission line including inner and outer conductors; said outer conductor being electrically connected to the exterior surface of said anode structure, and said inner conductor being provided with a coupling member electrically connected to a point on said cavity resonator; and a pair of pole pieces disposed adjacent said anode structure at opposite ends of said cavity resonator; one of said pole pieces being supported within the coupling member of the inner conductor of said transmission line.

*8. An electron discharge device adapted to be connected to a load having a predetermined resistive impedance comprising: an electrically conductive envelope; a conductor connected to said envelope and constituting the outer conductor of a transmission line; a cathode mounted within said envelope; a plurality of anode arms extending inwardly from said envelope and surrounding said cathode; each pair of adjoining anode arms, together with that portion of said envelope therebetween, constituting a cavity resonator; and an electrically conductive member, the open end of which is connected to a point on one of said anode arms, the distance between said point of connection and the axis of said envelope having a predetermined value satisfying the equation*

$$200=\frac{L_T R_l}{\omega L_l^2}$$

*where*

*$R_l$=the value of the resistive component of the impedance looking into the transmission line when said load is connected to said device,*

*$L_T$=total equivalent inductance of a cavity resonator,*

*$\omega=2\pi$ times the frequency,*

$$L_l=\frac{15{,}240}{N}\left[\frac{(r_b-r_l)\left[\frac{\pi}{N}(r_b+r_l)-t\right]}{l+\frac{r_b-r_l}{3}}\right]$$

*where in the equation for $L_l$*

*N=the number of anode arms,*

*$r_b$=the radius of the envelope with respect to its axis,*

*$r_l$=the distance between the electrically conductive member and the axis of said envelope.*

*l=the length of the anode arms parallel with the axis of said envelope, and*

*t=the thickness of the anode arms, said electrically conductive member constituting the other conductor of said transmission line.*

WILLIAM C. BROWN.

REFERENCES CITED

The following references are of record in the file of this patent or the original patent:

UNITED STATES PATENTS

| Number | Name | Date |
|---|---|---|
| 2,414,085 | Hartman | Jan. 14, 1947 |
| 2,429,291 | Okress | Oct. 21, 1947 |
| 2,435,984 | Spencer | Feb. 17, 1948 |
| 2,442,118 | Donal, Jr. et al. | May 25, 1948 |
| 2,454,337 | Okress | Nov. 23, 1948 |
| 2,478,534 | Kather | Aug. 9, 1949 |